United States Patent

[11] 3,592,303

[72] Inventor  Burton M. Tincher
              South Bend, Ind.
[21] Appl. No. 834,253
[22] Filed     June 18, 1969
[45] Patented  July 13, 1971
[73] Assignee  The Bendix Corporation

[54] BOOT PROTECTOR
     4 Claims, 4 Drawing Figs.
[52] U.S. Cl. .................................................. 188/264 G,
                                            74/18.2, 92/168
[51] Int. Cl. .................................................. F16d 65/78
[50] Field of Search .......................................... 188/264 I,
                                      152; 92/165, 168; 74/18.1, 18.2

[56]            References Cited
           UNITED STATES PATENTS
3,385,118  5/1968  Mathews et al. ...............  74/18.2

Primary Examiner—George E. A. Halvosa
Attorneys—C. F. Arens and Plante, Arens, Hartz, Hix and Smith ABSTRACT: A heat shield protects a flexible boot that closes the actuator housing of a wedge brake. The shield includes an annular wall portion that overlies the outer peripheral portion of the boot and a lip portion extending from the annular wall portion. A retainer carried by the housing receives the lip to hold the heat shield in place. The annular wall is divided into a plurality of relatively movable units to permit flexing of the shield as the plunger extends.

PATENTED JUL 13 1971

INVENTOR.
BURTON M. TINCHER
BY
Plante, Arens, Hartz, Hix and Smith
ATTORNEYS

BRAKE RELEASED POSITION

BRAKE APPLIED POSITION

INVENTOR.
BURTON M. TINCHER

BOOT PROTECTOR

BACKGROUND OF THE INVENTION

This invention relates to a heat shield for a protector boot used to seal the actuator housing of a wedge brake against contamination.

A common design for heavy-duty truck brakes provides a torque spider having a pair of diametrically opposed actuator housings each having a pair of opposed pistons reciprocable therein. Each piston is connected to one end of a brake shoe. The plungers are adapted to force the shoes against a rotating drum when actuated by a wedge that is thrust between each pair of plungers to force the latter outwardly of the housing. Conventionally, one of each pair of plungers has an automatic adjustment mechanism which maintains the shoes a predetermined distance from the drum as the linings wear.

It is necessary to seal or shield the plungers against contaminants to assure high reliability performance from the plungers and particularly from the adjuster mechanism. For this reason, the bores of the housing have been sealed against the plungers by providing rubber boots at opposite ends of each housing interconnecting the plungers and the housing. However, rapid deterioration and failure of the boots has been experienced due to high ambient temperatures and heated particles impinging on the boot during a brake application. For this reason, it is necessary to shield the boot to achieve a satisfactory service life from the latter. However, the heat shield must be small enough to fit into the rather limited available space and must also be axially extendible with the boot and plunger. Moreover, the heat shield must be of a construction which is conducive to complete freedom of action and noninterference with the flexibility of the rubber boot.

SUMMARY OF THE INVENTION

Therefore, an important object of my invention is to provide a heat shield significantly smaller than previous devices yet which is capable of extending with the plunger.

Another important object of my invention is to reduce manufacturing costs of the brake assembly by providing a heat shield that is much easier to assemble to the housing than are present devices.

Still another important object of my invention is to provide a heat shield that protects the boot regardless of the position of the plunger.

DETAILED DESCRIPTION

Figure 1:
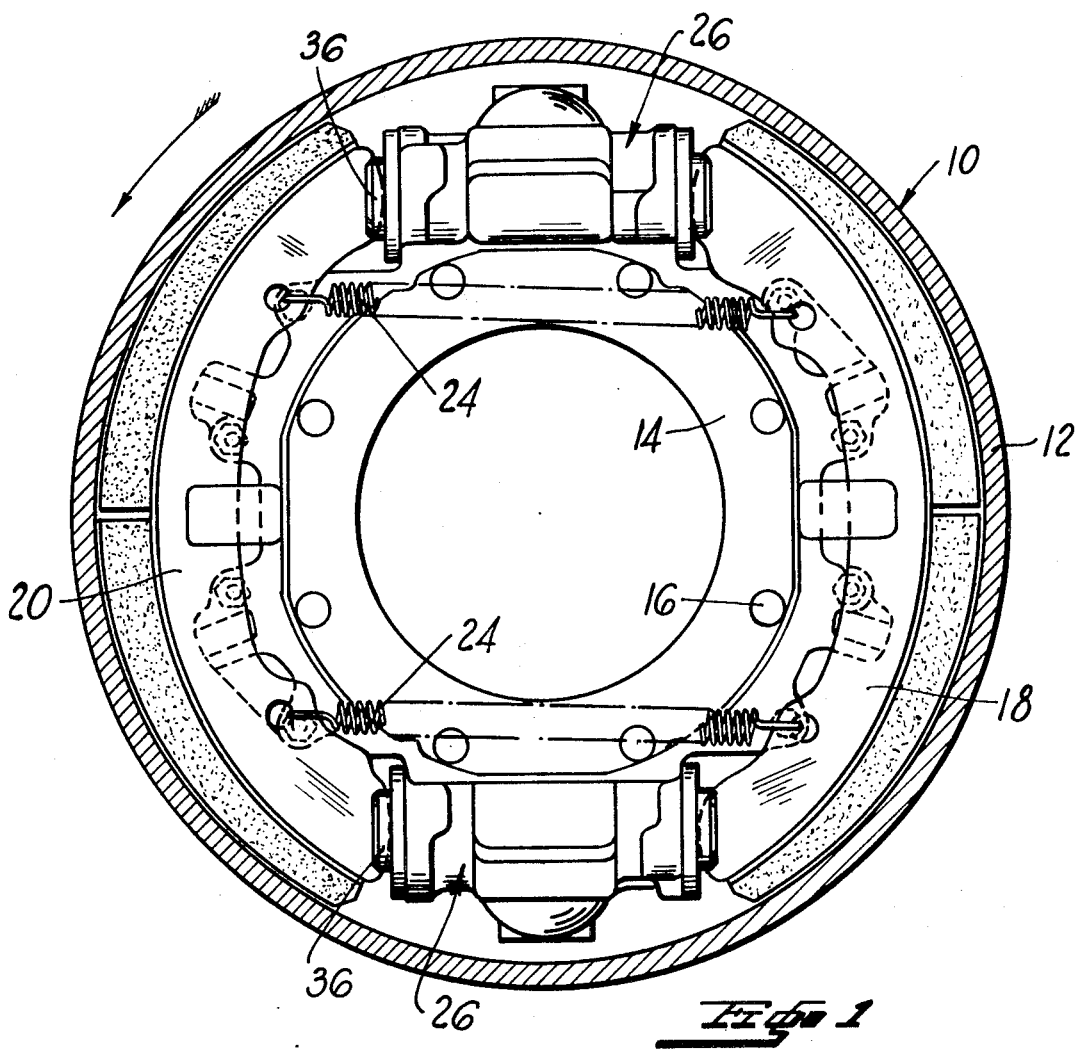
FIG. 1 is a front elevational view of a brake assembly.
Figure 4:
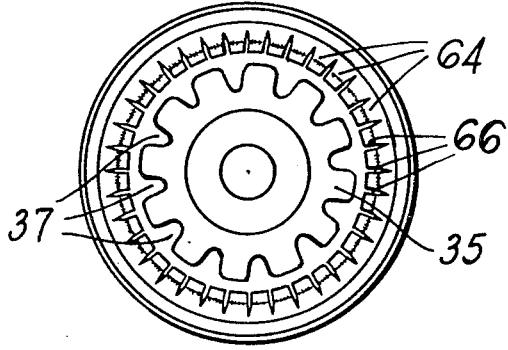
FIG. 4 is an enlarged end elevational view of the actuator housing with the brake shoe removed.

Referring now to the drawings, brake assembly 10 includes a drum 12 mounted for rotation with a wheel (not shown) to be braked. A torque spider 14 is adapted to be mounted on a nonrotative part of a vehicle, such as an axle flange, by inserting bolts (not shown) through circumferentially spaced openings 16. A pair of brake shoes 18 and 20, respectively, are yieldably biased away from the drum 12 by a pair of shoe return springs 24. Torque spider 14 further includes a pair of diametrically opposed housings 26 secured thereto, each of which contains a pair of slidable plunger assemblies 28. The plunger assemblies in each housing 26 are forced outwardly of the latter by a wedge (not shown) of any well-known type such as that shown in U.S. Pat. No. 2,527,126, owned by the assignee of the present invention, and incorporated herein by reference as need be for a more complete understanding of the present disclosure.

Each of the plunger assemblies 28 includes a hollow plunger sleeve 30 reciprocable in the bore 42 of housing 26 which carries an adjuster nut 32 that threadedly receives an adjuster screw 34 that is secured to the brake shoe 18 through a fitting 36. A flange member 38 extends from the nut 32 and has a plurality of teeth 40 formed about the circumference thereof projecting toward the open end of the bore 42. Movement of the plunger assembly 28 from the retracted position of FIG. 2 to the applied position of FIG. 3 will permit a spring-loaded pawl (not shown) to pick up a new one of the teeth 40, if lining wear has permitted the plunger 28 to move a sufficient distance from the housing to actuate the pawl. The pawl then rotates the nut 32 upon return of the plunger 28. Since the nut 32 threadedly engages the screw 34, rotation of the nut 32 extends the screw 34 from the nut, thus moving the shoes 18 and 20 closer to the drum 12 to compensate for lining wear. Screw 34 is provided with a radially outwardly projecting flange 35 having a series of circumferentially spaced recesses 37 adapted to receive a tool for manual adjustment of the shoes. The adjuster mechanism in itself forms no part of the present invention and is more completely described in U.S. Pat. No. 3,246,723, owned by the assignee of the present invention and incorporated herein by reference as need be for a more complete understanding of the present invention.

As will readily be appreciated by those skilled in the art, admission of foreign particles into the bore 42 will hinder proper operation of the adjuster mechanism. To exclude these contaminants, an annular, flexible boot 44 surrounds the screw 34 and interconnects the latter with the housing 26, thus closing the end of the bore 42. The outer peripheral edge 46 of the boot 44 is bonded to an annular retainer 47 that is carried by the housing. Retainer 47 includes a sleeve portion 48 that extends coaxially with the bore 42 and a radially inwardly projecting flange portion 50. Sleeve 48, flange 50, and the boot 44 form an elongated cavity 52 for receiving a lip 54 of a heat shield 56.

Figure 2:
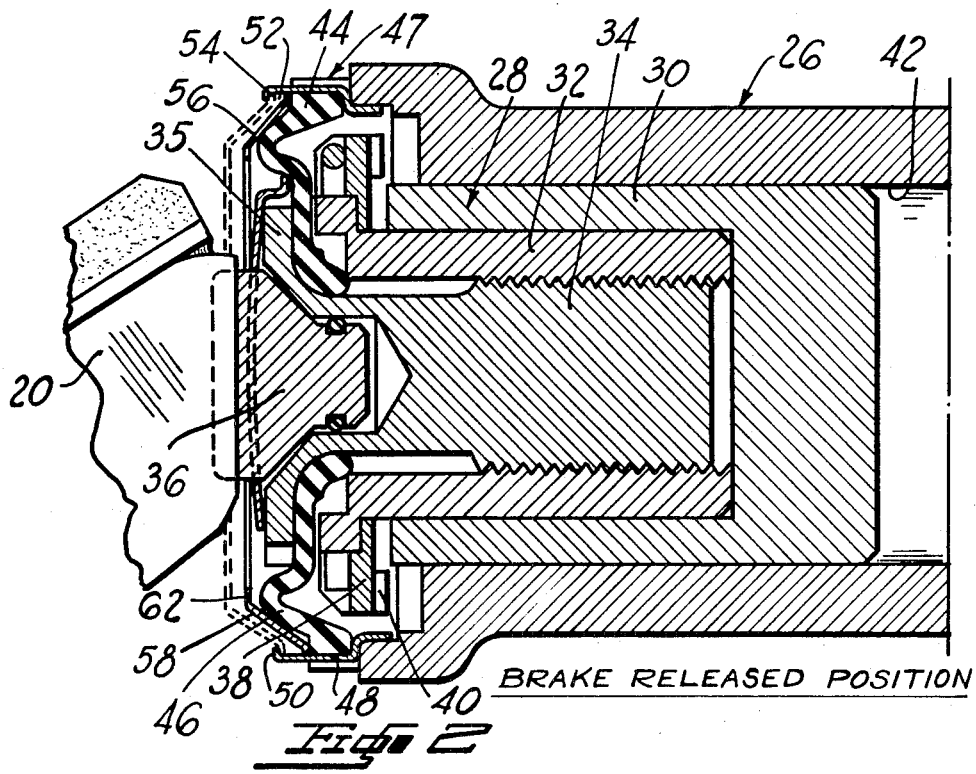
FIG. 2 is an enlarged, cross-sectional view of the actuator housing of the brake assembly illustrated in FIG. 1, shown in the brake release position.
Figure 3:
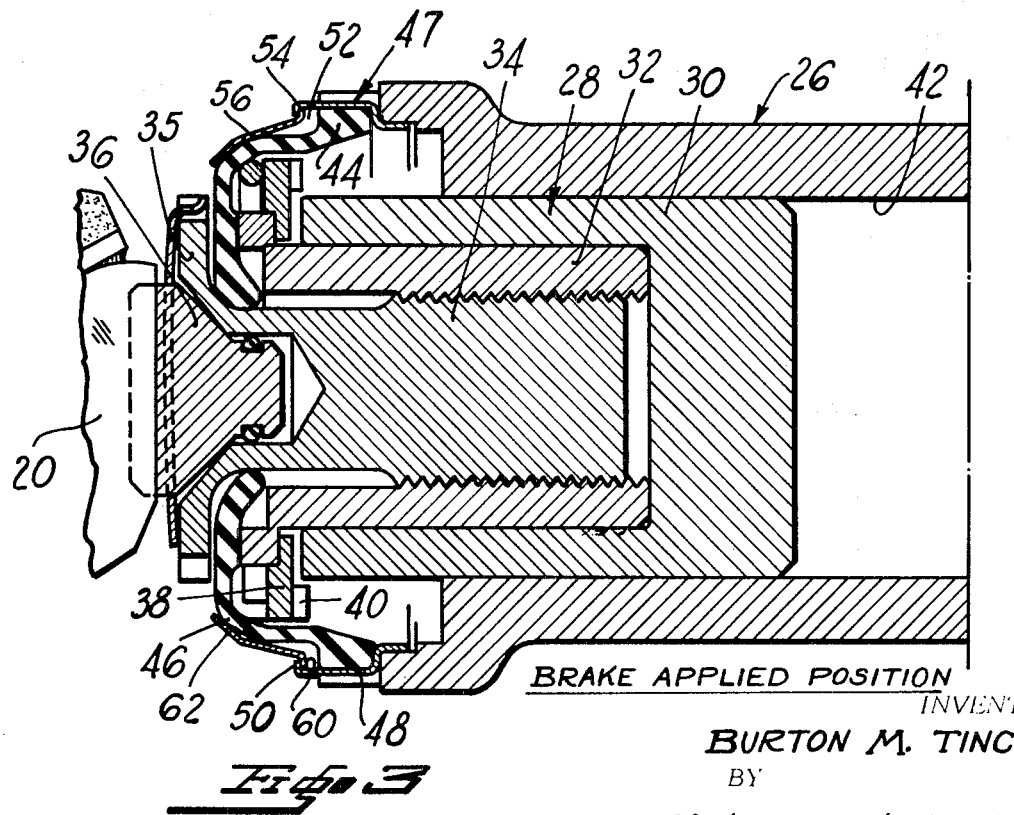
FIG. 3 is a view similar to FIG. 2 but illustrating the plunger in the brake-applied position.

Heat shield 56 includes an annular wall 58 having a radially outwardly projecting lip 60 extending from one end thereof which is retained in the cavity 52. Annular wall 58 has the general shape of a truncated right circular cone, and extends axially outwardly and radially inwardly from the lip 60 with respect to the housing 26 to overlie the peripheral portion 46 of the boot 44 and terminates in a radially inwardly extending annular surface 62 that extends generally parallel to the open end of the housing 26 when the plunger 28 is in the retracted position, as best shown in Fig. 2. The wall 58 and surface 62 are divided into a number of units 64 by a series of spaced slits 66 to permit relative movement between the units 64 toward and away from the axis of the bore 42 to provide for circumferential expansion of the heat shield as the plunger assembly 28 extends and retracts. It will be noted by those skilled in the art that the slits 66 are necessary only if the heat shield 56 is made of an inelastic material such as spring steel. However, if the heat shield 56 is made of an elastic material, such as fiberglass, the elasticity of the material permits the shield 56 to expand circumferentially so that slits 66 need not be provided.

MODE OF OPERATION

With the plunger assembly in the brake-released position illustrated in Fig. 2, the annular wall 58 and surface 62 overlays the outer peripheral portion 46 of the boot 44, thus shielding the latter from high ambient temperatures. Although the central portion of the boot 44 adjacent the adjuster screw 34 is left exposed, tests have demonstrated that shielding the peripheral portion alone is sufficient.

Upon actuation of the brake, heat shield 56 initially moves with the plunger 28 until the lip 60 engages the flange 50. This position is illustrated by the dashed lines in Fig. 2. Further movement of the plunger flexes the wall 58 and surface 62 in a radially outwardly direction with respect to the lip 60, the slits 66 permitting the units 64 to flex relative to each other so that the heat shield 56 assumes the position indicated in Fig. 3 where the plunger assembly 28 is fully extended. In this position, the heat shield continues to protect the outer peripheral portion 46 of the boot 44 against the ambient temperature and against heated particles of brake lining material that wear from the shoes during a brake application. The heat shield 56 thus not only protects the boot 44 when the brake is released, but is extendible in an axial direction to protect the boot during a brake application.

I claim:

1. In a brake having a brake shoe adapted to be forced against a rotating drum:

a housing defining a bore therewithin having an open end;

a piston reciprocable in said bore and operatively connected to said brake shoe for forcing the latter toward said drum;

a flexible boot carried by the housing engaging said piston to close said open end thereby excluding contaminants from said bore;

a heat shield carried by said housing to protect said boot;

said heat shield including an annular wall overlying said boot and a lip extending radially outwardly from said annular wall;

means dividing said annular wall into a plurality of relatively movable units to accommodate expansion of the boot as the piston extends from said bore; and means carried by said housing cooperating with said lip to retain said heat shield on said housing, said retaining means permitting relative axial movement between the heat shield and the housing.

2. The invention of claim 1:

said retaining means including a sleeve extending coaxially with said housing at said open end and a flange extending radially inwardly from said sleeve;

said flange and said sleeve cooperating with the upper surface of said boot to define an elongated cavity therebetween slidably receiving said lip to permit relative axial movement between the latter and said housing as the piston extends from said bore.

3. The invention of claim 1:

said dividing means being circumferentially spaced slits extending radially outwardly from the inner circumferential edge of said annular wall.

4. The invention of claim 3; and an annular surface projecting radially inwardly from said inner circumferential edge substantially parallel to said open end;

said slits extending through said annular surface.